US012688593B2

(12) United States Patent
    Jönsson

(10) Patent No.: US 12,688,593 B2
(45) Date of Patent: Jul. 21, 2026

(54) METHOD AND SYSTEM FOR MEDICAL IMAGE REGISTRATION

(71) Applicant: CarcinoQuant AB, Mölndal (SE)

(72) Inventor: Hanna Jönsson, Stockholm (SE)

(73) Assignee: CarcinoQuant AB, Mölndal (SE)

( * ) Notice: Subject to any disclaimer, the term of this patent is extended or adjusted under 35 U.S.C. 154(b) by 367 days.

(21) Appl. No.: 18/556,225

(22) PCT Filed: Apr. 20, 2022

(86) PCT No.: PCT/EP2022/060365
§ 371 (c)(1),
(2) Date: Oct. 19, 2023

(87) PCT Pub. No.: WO2022/223584
PCT Pub. Date: Oct. 27, 2022

(65) Prior Publication Data
US 2024/0185440 A1    Jun. 6, 2024

(30) Foreign Application Priority Data
Apr. 21, 2021    (EP) .................................... 21169609

(51) Int. Cl.
*G06T 7/30* (2017.01)
(52) U.S. Cl.
CPC ...... *G06T 7/30* (2017.01); *G06T 2207/10081* (2013.01); *G06T 2207/10104* (2013.01);
(Continued)
(58) Field of Classification Search
CPC ............. G06T 7/30; G06T 2207/10081; G06T 2207/10104; G06T 2207/20016;
(Continued)

(56) References Cited

U.S. PATENT DOCUMENTS 7,259,762 B2    8/2007 Tanacs et al.
2010/0067769 A1    3/2010 Neemuchwala et al.
(Continued)

FOREIGN PATENT DOCUMENTS

JP    2017-0080157 A    4/2017
WO    2016/072926 A1    5/2016

OTHER PUBLICATIONS

Akbarzadeh, A., Gutierrez, D., Baskin, A., Ay, M. R., Ahmadian, A., Alam, N. R., ... & Zaidi, H. (2013). Evaluation of whole-body MR to CT deformable image registration. Journal of Applied Clinical Medical Physics, 14(4), 238-253 (Year: 2013).*
(Continued)

*Primary Examiner* — Jennifer Mehmood
*Assistant Examiner* — Vaisali Rao Koppolu
(74) *Attorney, Agent, or Firm* — Porter Wright Morris & Arthur LLP

(57)    ABSTRACT

A method (100) for registering a first image (201*a*) comprising data significant for x-ray attenuation from a first medical imaging study and a second image (201*b*) comprising data significant for x-ray attenuation from at least a second 5 medical imaging study is provided, the method comprises a first registration (120) of said first image to said second image, wherein said first registration comprises optimization (122) of a first weighted cost function providing a first set of deformation parameters (124), said first weighted cost function comprising the sum of a correlation of the first image 10 to the second image; and a correlation of a first first subimage of said first image to a second subimage of said second image; and a second registration (140) comprising correlation (141) of at least part of said first image to at least part of said second image based on said first set of deformation parameters (124).

15 Claims, 8 Drawing Sheets

(52) U.S. Cl.
CPC ............... *G06T 2207/20016* (2013.01); *G06T*
*2207/30008* (2013.01)

(58) Field of Classification Search
CPC . G06T 2207/30008; G06T 2207/10116; G06T
2207/30004
USPC ......................................................... 382/128
See application file for complete search history.

(56) References Cited

U.S. PATENT DOCUMENTS

| | | | | |
|---|---|---|---|---|
| 2014/0270446 A1* | 9/2014 | Vija | ........................ | G06T 7/337 |
| | | | | 382/131 |
| 2018/0144472 A1* | 5/2018 | Kullberg | ............... | G06T 7/0014 |

OTHER PUBLICATIONS

Hasegawa, Akira et al., A Tool for Temporal Comparison of
Mammograms: Image Toggling and Dense-Tissue-Preserving Reg-
istration, In: Krupinski, E.A. (eds), Digital Mammography, IWDM
2008, Lecture Notes in Computer Science, Springer Berlin Heidelberg,
Berlin, Heidelberg, vol. 5116, pp. 447-454 (Jul. 20, 2008).
Office Action dated Feb. 3, 2026 from corresponding Japanese
Application No. 2023563025, pp. 1-9, with English Translation.

* cited by examiner

201b

202b

203b 204b
205b
206b

205b

207b

201a

202a

203a 204a
205a
206a

205a

207a

210

METHOD AND SYSTEM FOR MEDICAL IMAGE REGISTRATION

TECHNICAL FIELD

The inventive concept described herein generally relates to image registration more specifically to medical image registration.

BACKGROUND

Today image registration is used in different applications from, for example, computer vision to medical imaging. The methods of registration are mainly divided into rigid and non-rigid transformations. The rigid transformations include rotation, scaling, translation, and other affine transforms. The non-rigid transformations allow for local warping of a target image in order to find the best fit between for example a target image and a source image.

Generally, image registration may often result in misalignment between two images when aligning the two, an error that may increase with increased complexity of the images to register. Images depicting large areas and/or volumes, e.g. whole-body images or images containing large portions of a body often affect image registration negatively due to increased complexity of the images.

In medical imaging for example, the images may contain a lot of image information and features such as different areas or volumes depicting different tissue information. Typically, the image information is reduced to a few measured parameters subsequent to image processing.

In the published PCT-application, WO2016/072926 A1, a method for image registration and analysis of MRI images are disclosed.

In the published U.S. Pat. No. 7,259,762 B2, a method for automatically transforming computed tomography (CT) studies to a common reference frame to generate a statistical atlas is disclosed. Selected CT studies are transformed to a common reference frame and subsequently voxel-to-voxel correspondence is established between a CT and the statistical atlas.

In the published US patent application US 2014/0270446 A1, a method and apparatus for registration of multimodal imaging data using constraints is disclosed. First and second images obtained from first and second imaging modalities, respectively, are set as a target image and an object image, respectively. The object image is segmented into one or more anatomic segments. Each segment is associated with a respective anatomic class. At least one attribute is assigned to at least one of the anatomic segments based on the anatomic class corresponding to the anatomic segments. A registration is performed with the object image and the target image, wherein the registration is constrained by the assigned attributes.

However, there are drawbacks within prior art and the methods described above. For example, methods are often adapted to focus on too small region of interests, may provide inadequate registration accuracy and/or have inferior tissue segmentation.

SUMMARY OF THE INVENTION

It is an object of the present inventive concept to mitigate, alleviate or eliminate one or more of the above-identified deficiencies in the art and disadvantages singly or in combination.

According to a first aspect of the inventive concept, these and other objects are achieved in full, or at least in part, by a method for registering a first image and a second image, wherein said first image comprise data significant for x-ray attenuation from a first medical imaging study and said second image comprise data significant for x-ray attenuation from a second medical imaging study. The method comprises obtaining a first tissue class first subimage associated with said first image and comprising information of a first tissue class in said first image and obtaining a first tissue class second subimage associated with said second image and comprising information of said first tissue class in said second image, wherein the first tissue class is bone tissue. The method further comprises a first registration of said first image to said second image, wherein said first registration comprises optimization of a first weighted cost function. Said first weighted cost function comprising the sum of a correlation of the first image to the second image with a first weight factor of said first registration and a correlation of said first tissue class first subimage to said first tissue class second subimage with a second weight factor of said first registration. The first and second weight factors of said first registration are nonzero. A first set of deformation parameters from said first registration associated with a transformation of said first image to said second image are obtained from said optimization. The method further comprises a second registration of said first image to said second image, said second registration comprises correlation of at least part of said first image to at least part of said second image based on said first set of deformation parameters, wherein a second set of deformation parameters associated with a transformation of said first image to said second image are obtained from said correlation.

By registering the first image and the second image it is meant transforming the first image to align with said second image such that features within the first image are aligned to corresponding features in the second image, such features may be different tissue classes such as bone, lean soft tissue and/or fat. In other words, the first image may be transformed into the coordinate system of the second image. It should be understood that both the first and the second image may simultaneously be transformed to align in a coordinate system of an intermediate space. Hence, said first image may be arranged in a first space, and said second image may be arranged in a second space and both said first and second image may be transformed in said registration to align in a common intermediate space not identical to said first or second space.

By a set of deformation parameters it is meant a set of parameters indicating deformation of at least part of the image of which the set of deformation parameters is associated with. In other words, by a set of deformation parameters it is meant a set of parameters indicating transformation of the first image in order to have at least part of the features in said first image to align with corresponding features of the second image.

By x-ray study it is meant an x-ray examination of an object. The object may typically be a human or an animal and thus the study may typically result in an image of the object, i.e. the imaged object. The imaged object may be any part of said object, such as the body or parts thereof. This should be understood as torso or at least parts thereof head, arm(s), leg(s) or any part of the object that are analyzed. Parts of torso may be for example the chest and the abdomen.

By data significant for x-ray attenuation (i.e. absorption) from a first and second medical imaging study it is meant data comprising x-ray attenuation from different measurements, wherein said measurements may be performed at different points in time on the same or different objects.

The present invention is based on the understanding that correlation of two images by optimizing a weighted cost function, having both a specific tissue class from the first image, such as bone together with the first image, provides a correlation that is at least partly based on holistic image information together with information from a specific tissue class. This has shown to be advantageous by providing improved accuracy in the registration of two images. Furthermore, the method is advantageous by providing a stepwise registration of the first image to the second image, wherein the stepwise registration comprises at least a two-step registration where the correlation of the first image to the second image is improved in each step by using the information from previous step(s), i.e. minimizing the error and improving the alignment of the first and the second image and thus providing an improved set of deformation parameters. This may improve image registration and facilitate detection of anomalies in the first and/or second image. Said anomalies may be tumors, calcifications, cysts, and/or any other anomaly that may be of interest to detect such as benign and/or malignant changes occurring in tissues. The anomalies may be detected by changes in image intensity value and/or local tissue volume expansion/compression derived from said registration. Generally, the method has shown to be advantageous in aligning any two images acquired by the method depicting features of an object (for example when aligning images from the same object at different points in time) or objects (for example when aligning images from different objects). The method has shown to be especially advantageous for images containing large imaged volumes, for example images containing at least the abdomen and/or at least the torso of an object. Typically, with increased depicted areas and/or volumes the complexity of the images and thus the registration thereof are increased. However, the method has shown to overcome the increased complexity and provide a facilitated registration for images containing large image volumes. Hence, the image of the object from the x-ray study may typically comprise at least the abdomen, at least the torso of the object and/or the image of the object from the x-ray study may comprise the whole body of the object. Alternatively, the image of the object from the x-ray study may typically comprise at least 50% of the whole body of the object. Further, the invention is based on utilizing image data acquired by X-ray studies facilitating the segmentation of the different tissue classes. Images based on X-ray studies are particularly beneficial for segmenting bone tissue as bone tissue is detected with great contrast in X-ray imaging compared to for example MRI imaging.

The images may be for example three-dimensional (3D) images, i.e. volume images, or two-dimensional (2D) images.

A weighted cost function should be understood as a function to be optimized comprising more than one parameter, wherein each parameter is associated with a corresponding weight factor. The parameters may typically be a correlation of at least part of the first image to at least parts of the second image.

The second registration is based on the first set of deformation parameters obtained from the first registration, this means that the second registration may use the deformation parameters from the first registration directly or the second registration may use a set of deformation parameters from any registration step between the first and second registration that in turn is based on the deformation parameters form the first registration and outputs a new set of deformation parameters that may be used in said second registration. This way of stepwise improving the deformation parameters in each step of registration will even further improve the alignment of the first image to the second image. In other words, when performing the second registration the deformation parameters from a preceding registration step, which may be the first set of deformation parameters, further improve the second registration providing an improved alignment of the first image to the second image. In yet other words, the deformation parameters from a preceding registration step may be used when performing the second registration and may be the deformation parameters from said first registration, i.e. first set of deformation parameters, or any intermediate step of registration that may be performed after said first registration and before said second registration. Analogously, the deformation parameters from said first registration, i.e. the first set of deformation parameters may be used in any subsequent steps of deformation and/or registration, such as the second registration or any intermediate step of registration that may be performed after said first registration. Alternatives thereof will be more apparent in the embodiments disclosed below.

The deformation parameters may be referred to as a deformation field, where the deformation field may comprise vectors for each voxel or pixel in the image. The set of deformation parameters may be used as an initial guess of deformation (or transformation if you will) for the whole or at least part of the first image to align to the second image. In other words, the set of deformation parameters may comprise voxelwise or pixelwise transformation information for all or part of the voxels or pixels in the first image.

The first registration takes into account bone tissue which has shown to be favorable as the first tissue class to use when performing the first registration, since bone is relatively rigid compared to other tissue classes within an object and when bone tissue is registered the surrounding tissue tends to keep a relative distance from the bones that is fairly similar between objects. By bone tissue it is hereby meant tissue within an object comprising substantially bone having Hounsfield values of more than 150, preferably more than 200. Hounsfield values of 150-350 may typically be associated with low density bone tissue.

The first registration may provide a first set of constraint parameters defining a set of image voxels in said first image associated with said first tissue class and said second registration may take said first set of constraint parameters into account by said first set of constraint parameters defining a set of voxels in the first image having a predefined limitation of registering when preforming said second registration.

Generally, the constraint parameters may define voxels where transformation thereof may be limited or not needed according to the predefined limitation when performing a subsequent step of registration, since a transformation thereof has already been performed, which may provide even further improved accuracy of the registration since tissue classes already used when registering, may be registered according to the predefined limitation when performing subsequent registration steps. Accordingly, the predefined limitation of registering may be defined as number of voxels allowed for said voxels to be transformed when performing a subsequent registration step. This may reduce the risk of having image voxels to be misplaced during a subsequent registration step, since registration may be performed for different tissue class(es) than the tissue class used to obtain the actual constraint parameters. The voxels defined by the constraint parameters may hence depict parts of an object allowed to have a limited transformation or be locked into position, i.e. not allowed to be transformed at all in order to align the first image in any of the subsequent steps. For example, the voxels defined by the constraint parameters from the first registration may define voxels to be locked into position or voxels allowed to transform within a defined number of voxels, such that these voxels during subsequent registration steps, such as the second registration, will be less affected by the registration than other voxels in the first image. Accordingly, the amount of data to process when performing the second registration may be reduced or limited by applying the set of constraint parameters since voxels defined by the set of constraint parameters may in at least some embodiments be excluded from the second registration.

According to an embodiment the method comprises obtaining a second tissue class first subimage associated with said first image and comprising information of a second tissue class in said first image, and obtaining a second tissue class second subimage associated with said second image and comprising information of said second tissue class in said second image, wherein the second tissue class is selected from a group comprising lean soft tissue and fat tissue. The correlation of at least part of said first image to at least part of said second image in said second registration comprises optimization of a second weighted cost function, said second weighted cost function comprising the sum of a correlation of the first image to the second image with a first weight factor of the second registration and a correlation of the second tissue class first subimage to said second tissue class second subimage with a second weight factor of the second registration, said first and second weight factors of the second registration are nonzero. Said second registration may provide a second set of constraint parameters defining a set of image voxels in said first image associated with said second tissue class. Said second set of deformation parameters are obtained from said optimization.

This embodiment is advantageous in providing an improved registration of the first image to the second image, by providing the second set of deformation parameters, since a correlation is performed of both the holistic information of first image to the second image and the specific information of the first image to the second image, i.e. by registering the images with respect to lean soft tissue or fat tissue. In other words, the second set of deformation parameters further defines translation of first image voxels in order to align with the second image. This has shown to further increase the accuracy of the registration and reduce the error of alignment between the first and second image. Further, by the second registration providing a second set of deformation parameters this may further define voxels in the first image where transformation thereof may be limited or not needed according to the predefined limitation when performing a subsequent registration step.

The method may further comprise obtaining a third tissue class first subimage of said second registration associated with said first image and comprising information of a third tissue class in said first image and obtaining a third tissue class second subimage of said second registration associated with said first image and comprising information of a third tissue class in said second image, wherein the second tissue class is lean soft tissue and the third tissue class is fat tissue. The second weighted cost function may comprise the sum of a correlation of the first image to the second image with a first weight factor of said second registration, a correlation of said second tissue class first subimage to said second tissue class second subimage with a second weight factor of the second registration and a correlation of said third tissue class first subimage to said third tissue class second subimage with a third weight factor of the second registration, said first, second and third weight factors of said second registration are nonzero. Said second registration further provides constraint parameters to the second set of constraint parameters defining a set of image voxels in said first image associated with said third tissue class. By lean soft tissue it is hereby meant tissue within an object comprising body organs, muscle tissue etc. having Hounsfield values of −29 to 150. By fat tissue it is hereby mean tissue within an object having a composition substantially fat, having a Hounsfield values between −190 to −30.

By registering the first image by optimizing the weighted cost function comprising both fat tissue information and lean soft tissue information a further improved registration of the first image to the second image may be provided, since the second weighted cost function comprises correlation of both the holistic information of first image to the second image and the correlation of both fat and lean soft tissue in the first image and the second image, thus providing even further improved deformation parameters from said second registration.

According to an embodiment the method comprises obtaining a fourth tissue class first subimage associated with said first image and comprising information of composed tissues in said first image and obtaining a fourth tissue second subimage associated with said second image and comprising information of composed tissues in said second image. Said composed tissues are defined as tissues enclosed by subcutaneous fat in said first and second image respectively. The method further comprises obtaining a fifth tissue class first subimage associated with said first image and comprising information of fat tissue in said first image and obtaining a fifth tissue class second subimage associated with said second image and comprising information of fat tissue in said second image. The method further comprises an intermediate registration of said first image to said second image based on said first set of deformation parameters, wherein said intermediate registration comprises optimization of a third weighted cost function comprising the sum of a correlation of the first image to the second image with a first weight factor of said intermediate registration, a correlation of the fourth tissue class first subimage to the fourth tissue class second subimage with a second weight factor of said intermediate registration, and a correlation of the fifth tissue class first subimage to the fifth tissue class second subimage with a third weight factor of said intermediate registration, said first, second and third weight factors of the intermediate registration are nonzero. An intermediate set of deformation parameters associated with a transformation of said first image to said second image are obtained from said optimization and said second registration is based on said intermediate set of deformation parameters. By tissues enclosed by subcutaneous fat should be understood as any tissue or air allocated in the object excluding the subcutaneous fat, i.e. tissues or air defined in the first image and second image, respectively, after said subcutaneous fat and possibly the contour of the object has each been removed.

This embodiment is advantageous by further improving the accuracy of the registration by adding a step to the stepwise registering. As explained above the second registration may use a set of deformation parameter from any registration step between the first and second registration that in turn is based on the deformation parameters form the first registration. Hence, the second registration may use the set of intermediate deformation parameters from said intermediate registration, accordingly, said second step of registration may use an even improved set of deformation parameters further improving the accuracy of the registration.

Said intermediate registration may take the first set of constraint parameters into account by said first set of constraint parameters defining at least one set of voxels in the first image having a predefined limitation of registering when preforming said intermediate registration.

Further, said intermediate registration may provide a third set of constraint parameters defining at least one set of image voxels in said first image associated with said composed tissues, and said second registration may further take said third set of constraint parameters into account by said third set of constraint parameters defining at least one set of voxels in the first image having a predefined limitation of registering when preforming said second registration.

The third set of constraint parameters may define voxels on the border between the tissues enclosed by the subcutaneous fat and the subcutaneous fat in the first image. The third set of constraint parameters may further restrict voxels enclosed by the subcutaneous fat from being registered outside said border between the tissues enclosed by the subcutaneous fat and the subcutaneous fat in any subsequent step of registration.

According to an embodiment the method further comprises obtaining a sixth tissue class first subimage associated with said first image and comprising information of a sixth tissue class in said first image, and obtaining a sixth tissue class second subimage associated with said second image and comprising information of said sixth tissue class in said second image, wherein said sixth tissue class is subcutaneous fat. The method further comprises a third registration of said first image to said second image, wherein said third registration comprises optimization of a fourth weighted cost function comprising the sum of a correlation of the first image to the second image with a first weight factor of said third registration and a correlation of said sixth tissue class first subimage to said sixth tissue class second subimage with a second weight factor of said third registration, said first and second weight factors of said third registration are nonzero. A third set of deformation parameters associated with a transformation of said first image to said second image are obtained from said optimization.

This embodiment is advantageous in further improving the registration of the first image to the second image wherein the registration is further based on subcutaneous fat and thus obtaining improved deformation parameters providing an increased accuracy of the registration and/or any deformation based on said deformation parameters.

Said third registration may take at least said first set of constraint parameters into account, by said first set of constraint parameters defining a set of voxels in the first image having a predefined limitation of registering when preforming said third registration.

Said third registration may take at least said first and second sets of constraint parameters into account when said first and second sets of constraint parameters are respectively present, by said first and second set of constraint parameters defining a respective set of voxels in the first image having a predefined limitation of registering when preforming said third registration.

Said third registration may take at least said first, second and third set of constraint parameters into account when said first, second and third sets of constraint parameters are respectively present, by said first, second and third set of constraint parameters defining a respective set of voxels in the first image having a predefined limitation of registering when preforming said third registration.

It should be understood that said first, second and third constraint parameters may all comprise different limitations to the voxels defined by the respective set of constraint parameters. In other words, constraint parameters from said first registration may define a first predefined limitation of registering. Constraint parameters from said second registration may define a predefined limitation of registering, e.g. a second predefined limitation of registering. Constraint parameters from said intermediate registration may define a predefined limitation of registering, e.g. a third predefined limitation of registering.

By further using the constraint parameters from all or at least part of the preceding steps of image registration when performing said third registration an improved registration of the first image to the second image may be provided since the tissue classes already registered in the preceding steps are limited in said third registration according to a predefined limitation of registering. In other words, this may be advantageous by minimizing the error of the alignment of the first and the second image and thus providing an improved set of deformation parameters as the previously registered tissue classes may be locked into position and may not be allowed to be altered during said third registration step. This may in turn provide improved registration and/or deformation of at least one of the first and second image in possible subsequent steps.

According to an embodiment each step of obtaining a respective tissue class subimage associated with said first image comprises identifying based on the data in said first image a first set of first image voxels associated with the respective tissue class in said first image and wherein the first set of first image voxels represents the respective tissue class based on the data in said first image, and creating a subimage associated with said first image from said identified first set of first image voxels in said first image. Each step of obtaining a respective tissue class subimage associated with said second image comprises identifying based on the data in said second image a second set of second image voxels associated with the respective tissue class in said second image and the second set of second image voxels represents the respective tissue class based on the data in said second image, and creating a subimage associated with said second image from said identified second set of second image voxels in said second image.

This embodiment is advantageous in providing facilitated segmentation of the first and second image and thus provides a facilitated registration of the first image to the second image.

Each respective correlation of the first image to the second image may be selected from a group comprising normalized cross correlation, sum of squared differences and mutual information and wherein each correlation of each first subimage to each respective second subimage may be selected from a group comprising normalized cross correlation, sum of squared differences and mutual information.

The method may comprise affine registration of said first tissue class first subimage to said first tissue class second subimage, wherein an initial set of deformation parameters associated with a transformation of said first image to said second image are obtained from said affine registration. Said first registration may be based on said initial set of deformation parameters.

Performing an affine registration prior to the first registration may be advantageous by providing the initial set of deformation parameter that may be used an initial guess for the first registration, thus facilitating the subsequent steps of image registration.

The method may also comprise image cropping of said first tissue class first subimage and said first tissue class second subimage according to a predetermined cropping region.

By cropping the respective first tissue class first subimage and the first tissue class second subimage, a facilitated registration may be provided having less data to register. Further, by registering a predefined cropping region the registering may be facilitated by limiting data and ensuring the right data is included in the subsequent step of registering. For example, the images may be cropped such that a known ROI is used when performing said image registration.

The method may comprise initial image adjustment of a first pre-image of said first image and of a second pre-image of said second image, wherein said initial image adjustment outputs said first and second image, respectively, and comprises at least one of intensity scaling comprising linear or non-linear intensity scaling of said first and second pre-image, respectively and image filtering comprising applying at least one of a mean filter, a median filter and a Sobel filter to said first and second pre-image, respectively.

Intensity scaling may be advantageous in providing a first and second image with intensities therein being scaled and adapted to further facilitate distinguishing the different tissue classes in at least one of the subsequent registration steps. Further, by applying an image filter, a facilitated distinguishing of the different tissue classes in at least one of the subsequent registration steps may be provided. For example, applying a Sobel filter to said first and second pre-image edge detection of the images is facilitated which may further facilitate distinguishing the different tissue classes, particularly bone tissue. By pre-image it is hereby meant a pre-stage image of the respective first and second image, wherein the output of said initial image adjustment may be said first and second image respectively.

The method may comprise deforming said first image based on any of said sets of deformation parameters.

Deforming said first image based on any said sets of deformation parameters may be advantageous in achieving a deformed first image being aligned, i.e. registered with, the second image and thus facilitate comparison of the first image to the second image.

The method may also comprise obtaining a third image captured in a Positron Emission Tomography, PET, study, wherein said third image has a known spatial and temporal relationship to said first image. The method may further comprise deforming said third image based on any of said sets of deformation parameters.

Deforming the third image based on any of said sets of deformation parameters may be advantageous in achieving a deformed third image captured in a PET study and align this third image to the second image. For example, the first image comprising data significant from x-ray attenuation from a first medical imaging study may be obtained from a PET-CT scan, wherein the temporal and spatial relationship to the third image is known.

According to a second aspect, a system for processing image information comprising a processing unit, wherein said processing unit is configured to perform the method according to any one of the preceding embodiments is provided.

This second aspect has corresponding advantages as for the first aspect provided above.

A feature described in relation to one aspect may also be incorporated in other aspects, and the advantage of the feature is applicable to all aspects in which it is incorporated.

Other objectives, features and advantages of the present inventive concept will appear from the following detailed disclosure, from the attached claims as well as from the drawings.

Generally, all terms used in the claims are to be interpreted according to their ordinary meaning in the technical field, unless explicitly defined otherwise herein. Further, the use of terms "first", "second", and "third", and the like, herein do not denote any order, quantity, or importance, but rather are used to distinguish one element from another. All references to "a/an/the [element, device, component, means, step, etc.]" are to be interpreted openly as referring to at least one instance of said element, device, component, means, step, etc., unless explicitly stated otherwise. The steps of any method disclosed herein do not have to be performed in the exact order disclosed, unless explicitly stated.

BRIEF DESCRIPTION OF THE DRAWINGS

The above, as well as additional objects, features and advantages of the present inventive concept, will be better understood through the following illustrative and non-limiting detailed description of different embodiments of the present inventive concept, with reference to the appended drawings, wherein.

The figures are not necessarily to scale, and generally only show parts that are necessary in order to elucidate the inventive concept, wherein other parts may be omitted or merely suggested.

DETAILED DESCRIPTION

Figure 1:
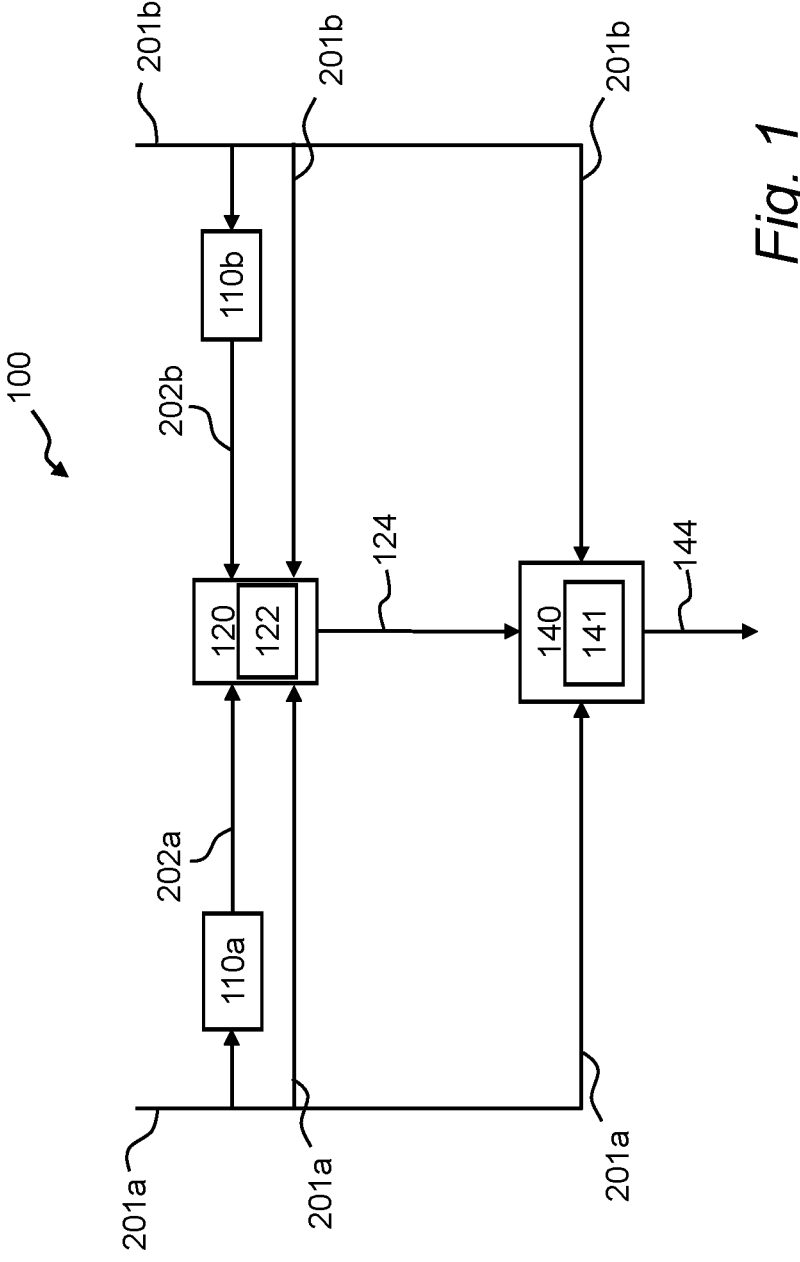
FIG. 1 schematically illustrates a method according to at least one embodiment.

FIG. 1 schematically illustrates the method 100 for registering a first image and a second image according to at least one embodiment. For clarity and simplicity, the method will be described in terms of 'steps'. It is emphasized that steps are not necessarily processes that are delimited in time or separate from each other, and more than one 'step' may be performed at the same time in a parallel fashion. Said first image 201a comprise data significant for x-ray attenuation from a first medical imaging study and said second image 202b comprise data significant for x-ray attenuation from a second medical imaging study. The method comprises obtaining 110*a* a first tissue class first subimage 202*a* associated with said first image and comprising information of a first tissue class in said first image 201*a*. The method further comprises obtaining 110*b* a first tissue class second subimage 202*b* associated with said second image 201*b* and comprising information of said first tissue class in said second image. The first tissue class is bone tissue.

The first tissue class first subimage 202*a* and the first tissue class second subimage 202*b* may be obtained in different ways. For example, at least one of the first tissue class first subimage 202*a* and the first tissue class second subimage 202*b* may be obtained from a pre-processing of said first and second image 201*a*,202*b*, respectively. Additionally or alternatively, at least one of the first tissue class first subimage 202*a* and the first tissue class second subimage 202*b* may be obtained by identifying the first tissue class within said first and/or second image 201*a*,202*b*, respectively. Said first tissue class first subimage 202*a* and/or said first tissue class second subimage 202*b* may be created from said identified first tissue class in said first and/or second image 201*a*,201*b*, respectively.

The method further comprises a first registration 120 of said first image 201*a* to said second image 201*b*, wherein said first registration 120 comprises optimization 122 of a first weighted cost function. Said first weighted cost function comprising the sum of a correlation of the first image to the second image with a first weight factor of said first registration and a correlation of said first tissue class first subimage to said first tissue class second subimage with a second weight factor of said first registration. The first and second weight factors of said first registration are nonzero. Hence, the first weighted cost function may take the form: $\Sigma$(W11\*correlation(first image 201*a*, second image 201*b*), W12\*correlation(first tissue class first subimage 202*a*, first tissue class second subimage 202*b*)), wherein W11 and W12 are the first and second weight factors of said first registration, respectively. A first set of deformation parameters 124 from said first registration 120 associated with a transformation of said first image 201*a* to said second image 201*b* are obtained from said optimization 122.

The method further comprises a second registration 140 of said first image 201*a* to said second image 201*b*, said second registration 140 comprises correlation 141 of at least part of said first image 201*a* to at least part of said second image 201*b* based on said first set of deformation parameters 124, wherein a second set of deformation parameters 144 associated with a transformation of said first image 201*a* to said second image 201*b* are obtained from said correlation 141. Accordingly, the correlation 141 may use said first set of deformation parameters directly or indirectly, i.e. when used directly it is hereby meant that the set of deformation parameters may be used as initial guess when performing said correlation 141.

The first and second medical imaging study may be studies performed in a CT scanner (computed tomography scanner). Accordingly, said first and second image may be a respective first and second CT image.

The correlation 141 of at least part of said first image 201*a* to at least part of said second image 201*b* may be any type of image correlation where at least part of the first image 201*a* is registered to at least part of said second image 201*b*.

It should hence be understood that the method 100 comprises a stepwise registering of the first image 201*a* to the second image 201*b* in order to provide improved registering of the first image 201*a* to the second image 201*b*. Further, the use of both the first and second image 201*a*, 201*b* with respective subimages in the first registration and/or in any succeeding registration steps of the method according to embodiments which will be discussed further down, will provide a registration based on both the image information from the whole image in the respective image which are registered (first and second image) and specific tissue information provided therein. This has shown to increase the accuracy of the registration (of the first and second image) in each respective step where information from the respective first and second image 201*a*,201*b* are used together with the subimages obtained for each respective first and second image 201*a*, 201*b*. Additional embodiments with additional steps in the method and a provided system will be discussed to the following drawings.

Figure 2:
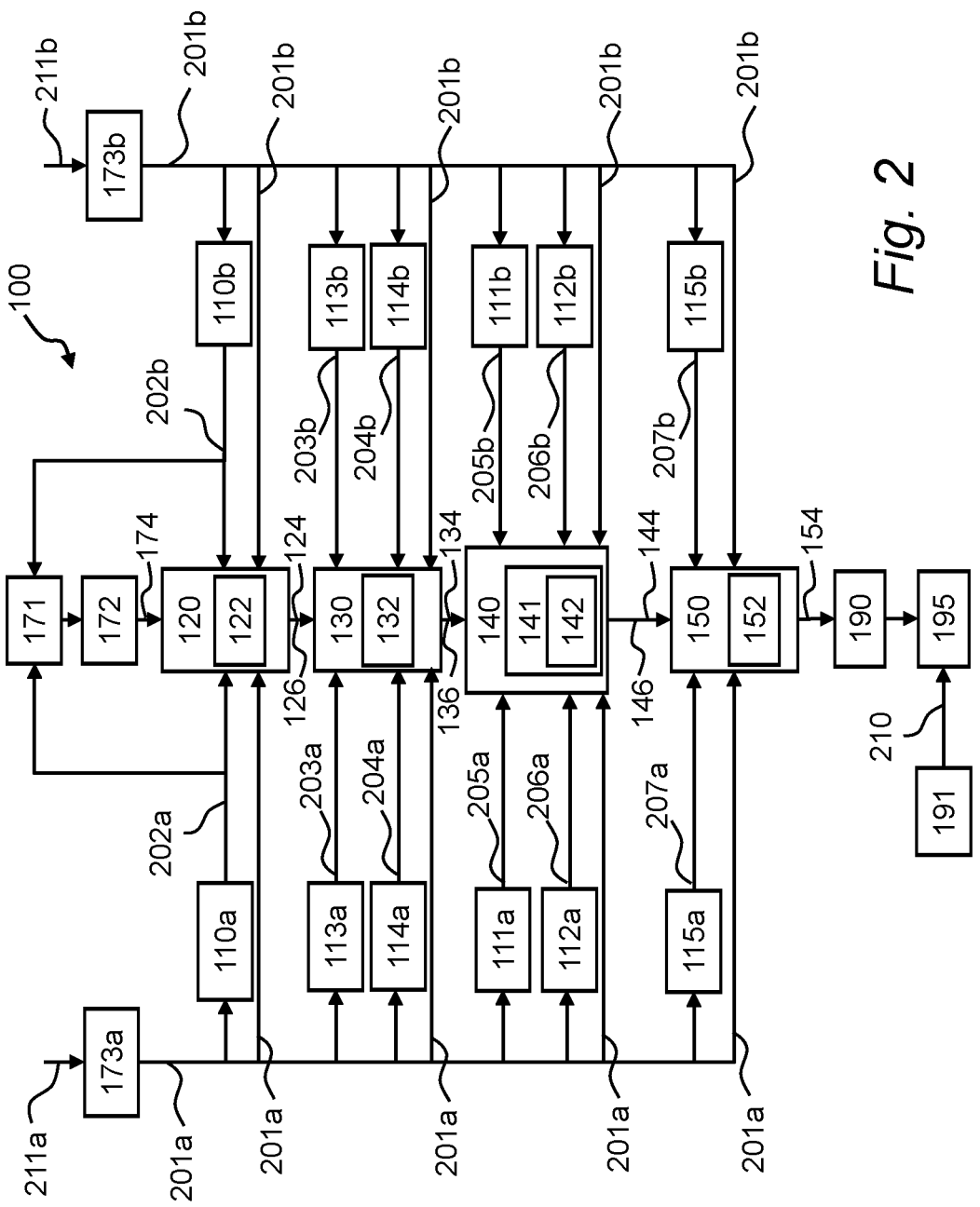
FIG. 2 schematically illustrates a method according to at least one embodiment.

The method will now be discussed with reference to FIG. 2 schematically illustrating the method 100 according to at least one embodiment. The method shown in FIG. 2 is similar to the one shown with reference to FIG. 1, for example the first registration is performed identical to what was previously discussed to FIG. 1. However, in FIG. 2 the method 100 is disclosed comprising additional steps, such as an intermediate registration 130 performed after said first registration 120 and before said second registration 140. Further, FIG. 2 shows that the correlation 141 of at least part of said first image to at least part of said second image in said second registration 140 may comprise optimization 142 of a second weighted cost function. In general, each step provides deformation parameters 124,134,144,154 for use in a direct subsequent step of registration and/or a deformation step. The deformation parameters 124,134,144,154 may define a field of vectors for each voxel of at least part of the voxels in said first image indicating the transformation for each respective voxel in order to register said first image to said second image. It should be understood that not all voxels in said image are necessarily defined by the deformation parameters, accordingly at least part of the voxels in the first image may be defined by said deformation parameters. However, it should be understood that all the voxels in said first image may be defined by said deformation parameters. For 3D images, i.e. volume images, these images may be defined in three orthogonal directions, x-direction, y-direction and z-direction. The field of vectors for each voxel of at least part of the voxels in said first image may comprise a vector defined in each respective direction, i.e. in the x-direction, y-direction and z-direction.

The method may comprise the intermediate registration 130 of said first image to said second image based on said first set of deformation parameters 124. Hence, the first set of deformation parameters 124 obtained from said first registration 120 may be used as initial guess when performing said initial registration 130.

The method may further comprise obtaining 113*a* a fourth tissue class first subimage 203*a* associated with said first image and comprising information of composed tissues in said first image. Further the method may comprise obtaining 113*b* a fourth tissue second subimage 203*b* associated with said second image and comprising information of composed tissues in said second image. Said composed tissues are defined as tissues enclosed by subcutaneous fat in said first and second image 201*a*,201*b*, respectively.

Said composed tissues are defined as tissues enclosed by subcutaneous fat in said first and second image respectively. Preferably, said composed tissues are obtained by subtraction of skin tissue and the subcutaneous fat from the imaged object in said first image. The tissues within the imaged object in said first and second image, respectively, may be detected according to their Hounsfield values (HU). The skin tissue may be detected as soft tissue with HU between −29 and 150 within 5 mm from a contour of the object, such as a body contour. The contour of the object is defined as the outer border of the imaged object. Subcutaneous fat may be identified as HU between 190 and −30 directly underneath the skin tissue by either manual segmentation or automatic image processing algorithms. Bone tissue may be defined as HU above 150, preferably above 200, soft tissue has HU between −29 and 150, and fat has HU between −190 and −30. The tissues within the imaged object in said first and second image, respectively, may comprise tissue with lower HU values than the listed values such as low density tissue. Low density tissue may typically be tissue within the imaged object having a HU of below −190, preferably lower than −300 or lower than −500. The low density tissue may typically be tissues within the object comprising significantly more air. Air within the object may be defined as HU below −500. Subsequently, the subcutaneous fat and the skin tissue may be subtracted from the detected tissues and low density tissue within the object in order to provide said fourth tissue class first subimage 203a and said fourth tissue second subimage 203b. In other words, the subcutaneous fat and skin tissue may be subtracted from the imaged object in order to provide said fourth tissue class first subimage 203a and said fourth tissue second subimage 203b.

The method may further comprise obtaining 114a a fifth tissue class first subimage 204a associated with said first image and comprising information of fat tissue in said first image. The method may comprise obtaining 114b a fifth tissue class second subimage 204b associated with said second image and comprising information of fat tissue in said second image. In some embodiments, when said third tissue class first subimage 206a and said third tissue class second subimage 206b comprise information of fat tissue in said first and second image respectively, these images may be used as the fifth tissue class first subimage 204a and the fifth tissue class second subimage 204b, respectively.

Said intermediate registration 130 may comprise optimization 132 of a third weighted cost function comprising the sum of a correlation of the first image to the second image with a first weight factor of said intermediate registration, a correlation of the fourth tissue class first subimage 203a to the fourth tissue class second subimage 203b with a second weight factor of said intermediate registration, and a correlation of the fifth tissue class first subimage 204a to the fifth tissue class second subimage 204b with a third weight factor of said intermediate registration 130. Said first, second and third weight factors of the intermediate registration may be nonzero. Accordingly, the third weighted cost function may take the form: $\Sigma$(W31*correlation(first image 201a, second image 201b), W32*correlation(fourth tissue class first subimage 203a, fourth tissue class second subimage 203b), W33*correlation(fifth tissue class first subimage 204a, fifth tissue class second subimage 204b)), wherein W31, W32 and W33 are the first, second and third weight factors of the intermediate registration, respectively.

An intermediate set of deformation parameters 134 associated with a transformation of said first image 201a to said second image 201b may be obtained from said optimization 132 and said second registration 140 may be based on said intermediate set of deformation parameters 134. Accordingly, said intermediate set of deformation parameters 134 may be used as initial guess when performing the second registration 140. Said second registration 140 is based on said first set of deformation parameters 124 by using said intermediate deformation parameters 134 which has been deduced by said intermediate registration directly using said first set of deformation parameters 124. In other words, since the intermediate registration 130 directly uses the first set of deformation parameters 124 from said first registration 120, the second registration 140 which uses said intermediate deformation parameters 134 is also based on said first set of deformation parameters 124.

Further, constraint parameters may be provided by each registration step for use in subsequent step(s) of registration. Hence, the constraint parameters may be used in all subsequent steps of registration if more than one is present. The constraint parameters define voxels or pixels in the first image where registration in subsequent step(s) should be limited. Accordingly, the constraint parameters restrict, i.e. limit, the amount of allowed transformation for the defined voxels. The voxels defined by the constraint parameters may be locked into position such that transformation thereof is prohibited. The voxels defined by the constraint parameters may be allowed to move according to a predetermined limitation in subsequent registration steps, which may be defined as number of voxels in each direction in the image, i.e. x-direction, y-direction, and z-direction, for volume images. The predefined limitation may be within 10 voxels, preferably, within 5 voxels, more preferably within 2 voxels, most preferably within 0 voxels. By 0 voxels it should be understood that the voxels defined by the constraint parameters will not be allowed to be transformed when registering, i.e. they may be locked into position. By more than one voxels, such as within 10 voxels, within 5 voxels, and/or within 2 voxels it should be understood that the voxels defined by the constraint parameters will be allowed to transform within the respectively defined voxels in at least one of the x-direction, y-direction and z-direction. Accordingly, constraint parameters may be defined in each registration step of the registration method and subsequent steps of each respective registration step may take the constraint parameters from each respective registration step into account by limiting the registration, i.e. transformation, of voxels in the first image defined by the constraint parameter according to the predetermined limitation. The constraint parameters that may be defined in each registration step of the registration may define voxels based on the tissue class used when registering said first image to said second image in each respective registration step. The respective at least one set of voxels in the first image defined by each respective set of constraint parameters may be associated with voxels comprising the respective tissue class used in each respective registration step.

The correlation 141 of at least part of said first image to at least part of said second image in said second registration 140 may comprise optimization 142 of a second weighted cost function.

The method may also comprise obtaining 111a a second tissue class first subimage 205a associated with said first image and comprising information of a second tissue class in said first image, and obtaining 111b a second tissue class second subimage 205b associated with said second image and comprising information of said second tissue class in said second image. The second tissue class may be selected from a group comprising lean soft tissue and fat tissue. Said second weighted cost function may comprise the sum of a correlation of the first image to the second image with a first weight factor of the second registration and a correlation of the second tissue class first subimage to said second tissue class second subimage with a second weight factor of the second registration, said first and second weight factors of the second registration are nonzero. Said second set of deformation parameters 144 may be obtained from said optimization 142. Accordingly, the second weighted cost function may take the form: $\Sigma(W21^*$correlation(first image 201a, second image 201b), $W22^*$correlation(second tissue class first subimage 205a, second tissue class second subimage 205b)), wherein W21 and W22 are the first and second weight factors of the second registration, respectively.

The method may further comprise obtaining 112a a third tissue class first subimage 206a of said second registration associated with said first image and comprising information of a third tissue class in said first image and obtaining 112b a third tissue class second subimage 206b of said second registration associated with said first image and comprising information of a third tissue class in said second image 201b. The second tissue class may be lean soft tissue and the third tissue class may be fat tissue. The second weighted cost function may comprise the sum of a correlation of the first image to the second image with a first weight factor of said second registration, a correlation of said second tissue class first subimage 205a to said second tissue class second subimage 205b with a second weight factor of the second registration and a correlation of said third tissue class first subimage 206a to said third tissue class second subimage 206b with a third weight factor of the second registration, said first, second and third weight factors of said second registration are nonzero. Accordingly, the second weighted cost function may take the form: $\Sigma(W21^*$correlation(first image 201a, second image 201b), $W22^*$correlation(second tissue class first subimage 205a, second tissue class second subimage 205b), $W23^*$correlation (third tissue class first subimage 206a, third tissue class second subimage 206b)), wherein W21, W22, W23 are the first, second and third weight factors of the second registration, respectively. By lean soft tissue it is hereby meant tissue within an object comprising at least one of body organs, muscle tissue, body water, skin tissue, tendons, connective tissues etc., having Hounsfield values of −29 to 150. The lean soft tissue may typically be fat-free and bone mineral-free components of the object. By fat tissue it is hereby mean tissue within an object having a composition comprising substantially fat, having a Hounsfield values between −190 to −30.

The first registration 120 may provide a first set of constraint parameters 126 defining a set of image voxels in said first image associated with said first tissue class and said second registration 140 may take said first set of constraint parameters 126 into account by said first set of constraint parameters 126 defining a set of voxels in the first image having a predefined limitation of registering when preforming said second registration 140.

The set of image voxels in said first image associated with said first tissue class defined by the first set of constraint parameters 126 may hence have a limited registration when performing subsequent registration steps, such as the second registration and the intermediate registration when the respective registration steps are present.

Said second registration may provide a second set of constraint parameters 146 defining a set of image voxels in said first image associated with said second tissue class. Said second registration may further provide constraint parameters to the second set of constraint parameters 146 defining a set of image voxels in said first image associated with said third tissue class. Accordingly, said second set of constraint parameters 146 may be defining a set of image voxels in said first image associated with said second tissue class and third tissue class. Any subsequent step of image registration may thus limit the registration of said voxels defined by said second set of constraint parameters 146.

Further, the predefined limitation of registering in each respective set of deformation parameters may be the same for each respective set of deformation parameters. Alternatively or optionally, the predefined limitation of registering in each respective set of deformation parameters for at least two sets of deformation parameters of said sets of deformation parameters may be different, i.e. the voxels defined in said first registration may be limited according to a first predefined limitation that allows for less transformation in subsequent steps than for example voxels defined by the intermediate deformation parameters, i.e. the intermediate predefined limitation.

Said intermediate registration 130 may take the first set of constraint parameters 126) into account by said first set of constraint parameters 126 defining at least one set of voxels in the first image having a predefined limitation of registering when preforming said intermediate registration 130.

The at least one set of voxels in the first image may be associated with voxels comprising the first tissue class, i.e. bone tissue.

Further, said intermediate registration may provide a third set of constraint parameters 136 defining at least one set of image voxels in said first image associated with said composed tissues, and said second registration 140 may further take said third set of constraint parameters into account by said third set of constraint parameters defining at least one set of voxels in the first image having a predefined limitation of registering when preforming said second registration 140.

The at least one set of image voxels in said first image associated with said composed tissues may be voxels on the border between the tissues enclosed by the subcutaneous fat and the subcutaneous fat in the first image. The tissues enclosed by the subcutaneous fat should be understood as tissues and/or organs within an object. For humans and/or animals the tissues enclosed by the subcutaneous fat are typically all the organs and tissues within the body of the object. No further elaboration of the organs or tissues enclosed by the subcutaneous fat will hereby be discussed as the organs and/or different tissues present is well known in the art and the organs and/or tissues per se is not the object of the present invention with respect to said intermediate registration.

Accordingly, the third set of constraint parameters 136 may define voxels on the border between the tissues enclosed by the subcutaneous fat and the subcutaneous fat in the first image.

The method further comprises a third registration 150 of said first image to said second image.

The method may comprise obtaining 115a a sixth tissue class first subimage 207a associated with said first image and comprising information of a sixth tissue class in said first image, and obtaining 115b a sixth tissue class second subimage 207b associated with said second image and comprising information of said sixth tissue class in said second image, wherein said sixth tissue class is subcutaneous fat. Said third registration 150 may comprise optimization 152 of a fourth weighted cost function comprising the sum of a correlation of the first image 201a to the second image 201b with a first weight factor of said third registration 150 and a correlation of said sixth tissue class first subimage 207a to said sixth tissue class second subimage 207b with a second weight factor of said third registration, said first and second weight factors of said third registration are nonzero. A third set of deformation parameters 154 associated with a transformation of said first image 201a to said second image 201b are obtained from said optimization 152. Hence, the fourth weighted cost function may take the form: Σ(W41*correlation(first image 201*a*, second image 201*b*), W42*correlation(sixth tissue class first subimage 207*a*, sixth tissue class second subimage 207*b*)), wherein W41 and W42 are the first and second weight factors of said third registration, respectively.

Alternatively, said third registration 150 may comprise optimization 152 of a cost function comprising a correlation of said sixth tissue class first subimage 207*a* to said sixth tissue class second subimage 207*b*.

Said third registration 150 may take any set of deformation parameters present into account, by the present set of deformation parameters defining a set of voxels in the first image 201*a* having a predefined limitation of registering when preforming said third registration 150.

Accordingly, said third registration 150 may take at least said first set of constraint parameters 126 into account, by said first set of constraint parameters 126 defining a set of voxels in the first image 201*a* having a predefined limitation of registering when preforming said third registration 150.

Further, said third registration 150 may take the second set of constraint parameters 146 into account, by said second set of constraint parameters 146 defining a set of voxels in the first image 201*a* having a predefined limitation of registering when preforming said third registration.

Even further, said third registration 150 may said third set of constraint parameters 136 into account, by said third set of constraint parameters 136 defining set of voxels in the first image 201*a* having a predefined limitation of registering when preforming said third registration.

Accordingly, said first, second and third set of constraint parameters 126,146,136, when respectively present, may define a respective set of voxels, which may be superimposed into a combined set of voxels used as constraint parameters in said third registration 150.

Each respective correlation of the first image 201*a* to the second image 201*b* may be selected from a group comprising normalized cross correlation, sum of squared differences and mutual information. Each correlation of each first subimage 202*a*,203*a*,204*a*,205*a*,206*a*,207*a* to each respective second subimage 202*b*,203*b*,204*b*,205*b*,206*b*,207*b* may be selected from a group comprising normalized cross correlation, sum of squared differences and mutual information.

The method may comprise affine registration 172 of said first tissue class first subimage 202*a* to said first tissue class second subimage 202*b*, wherein an initial set of deformation parameters 174 associated with a transformation of said first image 201*a* to said second image 201*b* are obtained from said affine registration 172. Said first registration 120 may be based on said initial set of deformation parameters 174.

The initial set of deformation parameters may be used as an initial guess of registration for the first registration 120.

The method may also comprise image cropping 171 of said first tissue class first subimage 202*a* and said first tissue class second subimage 202*b* according to a predetermined cropping region.

Typically, the predetermined cropping region defines a predetermined volume of the object. This may for example be a specific volume of the body comprising anatomical sections of the body such as the torso, the head, the chest, the abdomen, the arms and/or the legs.

The affine registration 172 in combination with image cropping 171 may provide piecewise affine registration of the first tissue class first subimage 202*a* to said first tissue class second subimage 202*b*, wherein each cropped and affine registered part of the respective image may be merged into a respective complete first tissue class first subimage 202*a* and first tissue class second subimage 202*b*, respectively, of the object after the affine registration step 172. Hence it should be understood that the affine registration may be performed on different cropped regions of the first tissue class first subimage 202*a* and said first tissue class second subimage 202*b*, respectively. Accordingly, a facilitated affine registration 172 of first tissue class first subimage 202*a* to said first tissue class second subimage 202*b* may be provided.

The method may comprise initial image adjustment 173*a*, 173*b* of a first pre-image 211*a* of said first image and of a second pre-image 211*b* of said second image, wherein said initial image adjustment 173*a*,173*b* outputs said first and second image 201*a*, 201*b*, respectively, and comprises at least one of intensity scaling comprising linear or non-linear intensity scaling of said first and second pre-image, respectively and image filtering comprising applying at least one of a mean filter, a median filter and a Sobel filter to said first and second pre-image, respectively 211*a*, 211*b*.

The method may further comprise deforming 190 said first image based on any of said sets of deformation parameters 124,134,144,154. Each registration step may hence calculate the deformation parameters indicating a deformation of the first image to align or register with the second image. The deforming 190 may result in a registered image, wherein said registered image may be the deformed first image after deforming 190 said first image using any said sets of deformation parameters 124,134,144,154. Any one of the deformation parameters may be used when deforming the first image to said second image. Preferably, the deforming 190 of said first image may be based on the deformation parameters from the directly preceding registration step.

In at least one embodiment, the method may also comprise obtaining 191*a* third image 210 captured in a Positron Emission Tomography, PET, study, wherein said third image has a known spatial and temporal relationship to said first image. The method may further comprise deforming 195 said third image based on any of said sets of deformation parameters 124,134,144,154.

For example, the third image and the first image may both be captured in the same study, i.e. in the same apparatus, wherein the first and third images may be captured in a PET-CT scan. This may facilitate deducing the spatial and temporal relationship between said third and said first image.

Figure 3:
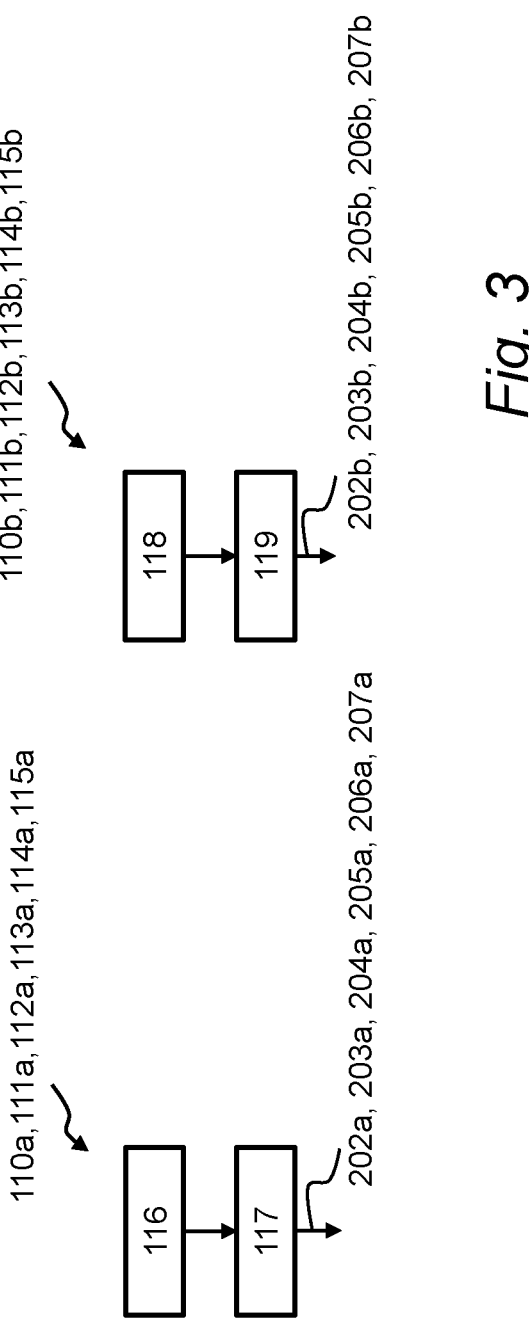
FIG. 3 schematically illustrates a method according to at least one embodiment.

With reference to FIG. 3 the respective step of obtaining 110*a*,111*a*,112*a*,113*a*,114*a*,115*a* a respective tissue class subimage associated with said first image and the respective step of obtaining 110*b*,111*b*, 112*b*,113*b*,114*b*,115*b* a respective tissue class subimage associated with said second image will be discussed. The steps of obtaining may be performed in one step where said first and second image are segmented such that each respective subimage is obtained or the steps may each be separate steps where each step of obtaining 110*a*,111*a*,112*a*,113*a*,114*a*,115*a* a respective tissue class subimage associated with said first image may comprise identifying 116 based on the data in said first image a first set of first image voxels associated with the respective tissue class in said first image. The first set of first image voxels may represent the respective tissue class based on the data in said first image. Each step of obtaining 110*a*,111*a*,112*a*, 113*a*,114*a*,115*a* may further comprise creating 117*a* subimage associated with said first image from said identified first set of first image voxels in said first image.

Further, each step of obtaining 110*b*,111*b*,112*b*,113*b*, 114*b*,115*b* a respective tissue class subimage associated with said second image comprises identifying 118 based on the data in said second image a second set of second image voxels associated with the respective tissue class in said second image and the second set of second image voxels represents the respective tissue class based on the data in said second image, and creating 119a subimage associated with said second image from said identified second set of second image voxels in said second image.

Since not all of the steps of obtaining may be present, at least one of the steps of obtaining 110a,111a,112a,113a, 114a,115a the respective first tissue class first subimage 202a, fourth tissue class first subimage 203a, fifth tissue class first subimage 204a, second tissue class first subimage 205a, third tissue class first subimage 206a, sixth tissue class first subimage 207a, each being associated with said first image 201a may comprise identifying 116 based on the data in said first image 201a a respective first set of first image voxels associated with the respective tissue class in said first image 201a. Said respective first set of first image voxels may represent the respective tissue class based on the data in said first image 201a. The at least one step of obtaining 110a,111a,112a,113a,114a,115a may further comprise creating 117 at least one of the first tissue class first subimage 202a, fourth tissue class first subimage 203a, fifth tissue class first subimage 204a, second tissue class first subimage 205a, third tissue class first subimage 206a, sixth tissue class first subimage 207a, each being associated with said first image 201a, from said identified respective first set of first image voxels associated with the respective tissue class in said first image.

Further, at least one of the steps of obtaining 110b,111b, 112b,113b,114b,115b the respective the first tissue class second subimage 202b, fourth tissue second subimage 203b, fifth tissue class second subimage 204b, second tissue class second subimage 205b, third tissue class second subimage 206b, sixth tissue class second subimage 207b each being associated with said second image 201b may comprise identifying 118 based on the data in said second image 201b a respective second set of second image voxels associated with the respective tissue class in said second image 201b. Said respective second set of second image voxels may represent the respective tissue class based on the data in said second image 201b. The at least one step of obtaining 110b,111b,112b,113b,114b,115b may further comprise creating 119 at least one of the first tissue class second subimage 202b, fourth tissue second subimage 203b, fifth tissue class second subimage 204b, second tissue class second subimage 205b, third tissue class second subimage 206b, sixth tissue class second subimage 207b, each being associated with said second image 201b, from said identified respective second set of second image voxels associated with the respective tissue class in said second image.

It should be understood that the subimages may be obtained in various ways such as a joint step wherein all subimages or part of the subimages are created in the same step or the subimages may be created outside said method. For example, the subimages may be obtained from a pre-processing step where the images may be segmented, i.e. each tissue class being identified and separated.

Each cost function in at least one of the steps of registration 120,130,140,150 may each further comprise applying at least one regularization term with corresponding regularization weight factor, RW, wherein said regularization weight factor may be applied voxelwise in each respective registration step. The regularization weight factor may have a value depending on the tissue class in the first and second images 201a,201b used in the respective registration step. In other words, the corresponding regularization weight factor, RW, may be specific for the tissue class in each respective voxel.

By corresponding regularization weight factor it is meant a weight defining the amount of deformation allowable for the specific tissue class. E.g. more dense tissue, such as bone, may not be allowed to deform as much as less dense tissue, such as lean soft tissue or fat tissue. Hence, a higher corresponding regularization weight factor may be applied on bone tissue than in for example lean soft tissue, fat tissue and/or subcutaneous fat. Applying the regularization term with corresponding regularization weight factor may be advantageous in improving the accuracy of the registration where the registration takes into account the tissue class in each respective voxel.

It should be understood that the regularization term in each registration step may further facilitate restricting neighboring voxels defined in each respective constrain parameters associated with the respective tissue class from being registered in a complete opposite direction relative to said voxels defined by the constraint parameters, i.e. voxels not defined in said constraint parameters and significant for tissues arranged in a positive x- y- or z-direction relative to voxels defined by said constraint parameters may not be transformed to have a negative z- y- or z-direction relative to the voxels defined by the constraint parameters.

Accordingly, each voxel comprising bone tissue in each respective registration step may have a first regularization weight factor, RW1, of between 0.6 and 0.8, preferably 0.7. Each voxel comprising fat, subcutaneous fat and/or lean soft tissue in each respective registration step may have a second regularization weight factor, RW2, of between 0.15 and 0.25, preferably 0.20.

For example, in said first registration 120 when bone tissue is used in said optimization 122, the first registration may apply a regularization term with a corresponding first regularization weight factor, RW1, to bone voxels during said optimization 122 of the first weighted cost function. In other words, the first registration may apply a regularization term with a corresponding first regularization weight factor, RW1, when correlating the first tissue class first subimage 202a to the first tissue class second subimage 202b. Further, in said first registration step the first image is registered to said second image and hence, RW2 may be applied for voxels comprising fat, subcutaneous fat and/or lean soft tissue.

As another example, in said second registration 140 when fat and/or lean soft tissue is used in said optimization 142, the second registration may apply a regularization term with a corresponding second regularization weight factor, RW2, to fat and/or lean soft tissue during said optimization 142 of the second weighted cost function. In other words, the second registration may apply a regularization term with corresponding second regularization weight factor, RW2, when correlating the second tissue class first subimage 205a to the second tissue class second subimage 205b. Further, in said second registration step the first image is registered to said second image and hence, the first regularization weight factor, RW1, may be applied for voxels comprising bone tissue.

For voxels containing air a regularization weight factor of 0.1 may be applied in each corresponding registration step where a cost function is applied.

Generally, each registration step applies the regularization term with corresponding regularization weight factor by (1–RW)*the respective weighted cost function+
RW*regularization term.

Wherein the respective weighted cost function is the cost function of each respective registration step.

It should be understood that the regularization term may comprise the first derivative of the deformation parameters squared, i.e. the first derivative of the deformation field squared. Alternatively, the regularization term may comprise the second derivative of the deformation parameters squared, i.e. the second derivative of the deformation field squared.

Figure 4:
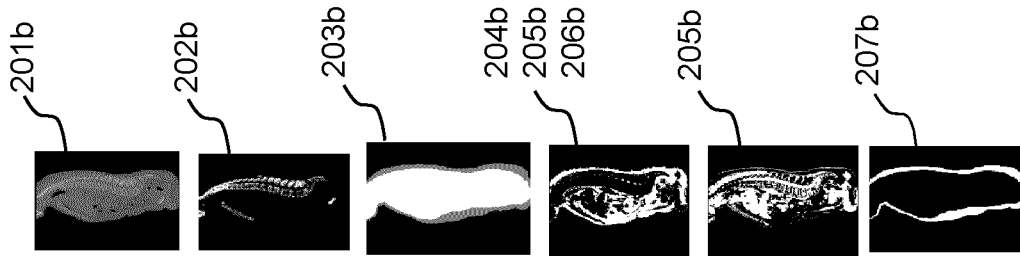
FIG. 4 schematically illustrates the different images according to at least one embodiment.
Figure 4:
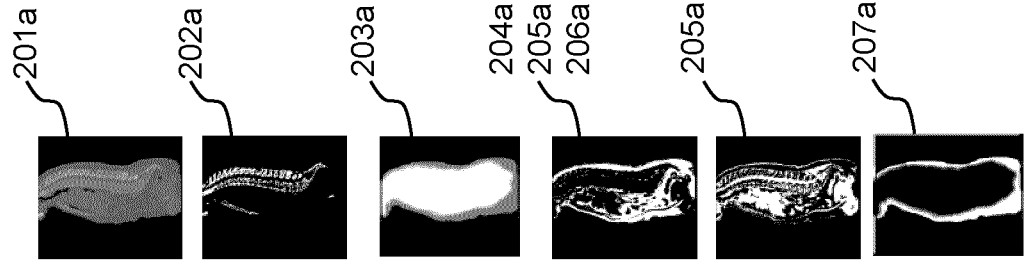
Figure 4:
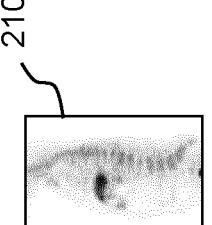

With reference to FIG. 4 the images in the method are exemplified.

Each subimage may be a binary image. The subimages may comprise a value of 0 for voxels outside the respective tissue class of which the subimage is associated. The subimages may comprise a value of 1 for voxels significant for the respective tissue class of which the subimage is associated.

Figure 5:
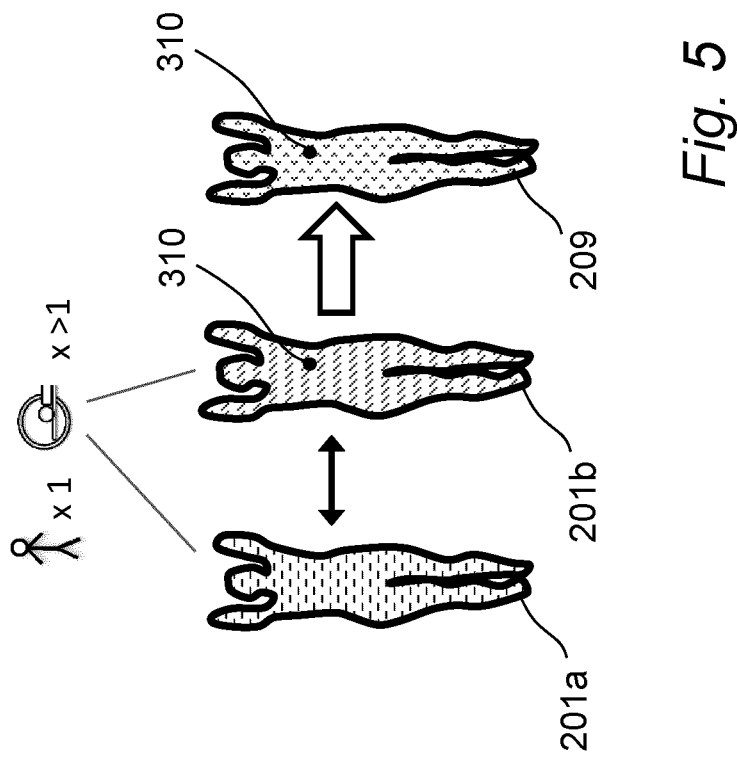
FIG. 5 schematically illustrates a comparison of the first image to the second image after registration of the first image to the second image according to at least one embodiment.

With reference to FIG. 5 registration of images according to at least one embodiment will be discussed. The registration of images in FIG. 5 is identical to the method of registration according to anyone of the previous embodiments previously discussed. The first image 201*a* may be registered to the second image 201*b* into a registered first image 209. After said registration the registered first image 209 may be compared to said second image 201*b*. Accordingly, the first image 201*a* may be registered to the second image 201*b*, wherein said first and second images 201*a*,201*b* may be captured at two different points in time for the same object. In other words, the first image 201*a* registered to said second image 201*b* may result in a registered image 209 that may be compared to at least one image captured at a previous point in time such as the said second image 201*b*. It should be understood that a plurality of second images 201*b* may be used, wherein said plurality of second images 201*b* may be captured at different points in time, wherein said plurality of second images 201*b* are captured prior to said first image 201*a*. Said plurality of second images 201*b* may all be registered to align with each other and the first image 201*a* may be registered to said plurality of second images 201*b*. Registration of said first image 201*a* to said second image 201*b* may facilitate detecting anomalies 310 in an object that occurs over time. Said anomalies may be tumors, calcifications, cysts, and/or any other anomaly that may be of interest to detect such as benign and/or malignant changes occurring in healthy tissues. The anomalies may be detected by changes in image intensity value and/or local tissue volume expansion/compression derived from said registration. Accordingly, this may facilitate tracking the progress of the health status of an object over time. It should be understood that registration according the registration in FIG. 5 may equally be applied to any images with a known spatial and temporal relationship to said first and second images 201*a*,201*b*. Said images with a known relationship to first and second images may comprise data from CT studies and/or Positron Emission Tomography, PET, studies.

Figure 6:
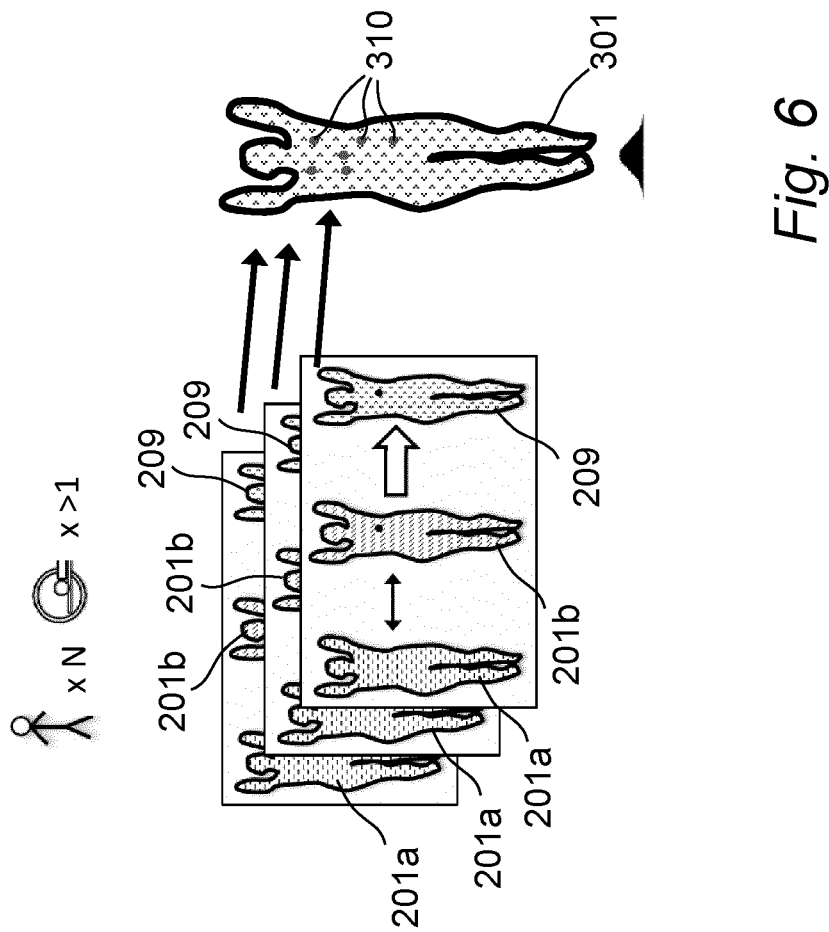
FIG. 6 schematically illustrates a comparison of the first image to a set of second images after registration of the first image to the set of second images according at least one embodiment.

With reference to FIG. 6 registration of images according to at least one embodiment will be discussed. The registration of images in FIG. 6 is identical to the registration according to anyone of the previous embodiments previously discussed. A respective set of first and second images 201*a*,201*b* may each be registered resulting in a respective registered first image 209. The registration of each set of first and second images 201*a*,201*b* is identical to what was discussed in FIG. 5. However, said respective set of first and second images may each be associated with different objects, e.g. different humans. Each registered first image 209 may subsequently be registered to each other forming a statistical first registered image 301 comprising information from each registered first image 209. One of said registered first images 209 may form the first image according to the method wherein another of said registered first images 209 may form the second image according to said method. Accordingly, a first registered image of said registered first images may be registered to a second registered image of said registered first images. Hence, each registered image may be iteratively registered to each other forming the statistical first registered image 301. In other words, a set of images of said registered first images may each be registered to the second registered image of said registered first images according to the method. Each registered first image 209 may comprise information on anomalies of each object from the respective first image 201*a*. Accordingly, the statistical first registered image 301 may comprise information on anomalies 310 from each respective registered first image 209, where the anomalies and the detection thereof are identical to the anomalies and the detection thereof as discussed to FIG. 5. This may facilitate comparisons between the detected anomalies in the different imaged objects. Comparisons may similarly be made between subgroups of different imaged objects, thus providing statistical parameters describing their difference. The registration of images in FIG. 6 may equally be applied to any images with a known spatial and temporal relationship to said first and second images. Said images with a known relationship to first and second images may comprise data from CT studies and/or Positron Emission Tomography, PET, studies.

Figure 7:
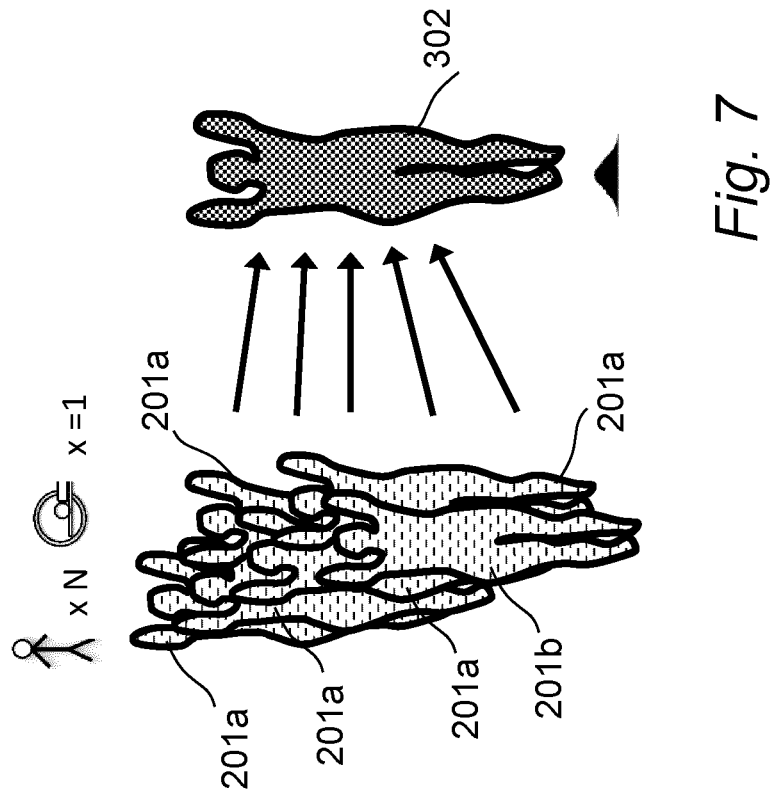
FIG. 7 schematically illustrates a registration of a plurality of first images to a second image according to at least one embodiment.

With reference to FIG. 7 registration of images according to at least one embodiment will be discussed. A plurality of first images 201*a* may be registered to a common space. For example, one of the images in the plurality of first images 201*a* may form the second image 201*b* according to the method. Each of said plurality of first images 201*a* may hence be deformed according to the registration of each first image 201*a* to said second image 201*b*. Subsequently, each one of said plurality of first images 201*a* and said second image 201*b* may be superimposed into a statistical image 302. Said statistical image 302 may further comprise information from the plurality of first images 201*a* and the second image 201*b*. This may be advantageous in providing a statistical distribution of for example healthy objects. The statistical image 302 may form the second image 201*b* according to the method such that another image of a human and/or animal, forming the first image 201*a*, may be registered to said statistical image 302. This may further facilitate diagnosing said human and/or animal by comparing the first image 201*a* of said human and/or animal to the statistical image 302. By performing this comparison, the statistical distribution from the plurality of first images 201*a* may be utilized to detect anomalies in said first image 201*a*. The anomalies and the detection thereof are identical to the anomalies and the detection thereof as discussed to FIGS. 5 and 6. The statistical image 302 may also comprise information on the spatial distribution of subfeatures already identified in the plurality of first images 201*a*. The subfeatures may comprise tumors or subsets of healthy tissues. Accordingly, this may facilitate the interpretation of the spatial distribution of such subfeatures in the registered images. As discussed in FIGS. 5 and 6, registration according to said description in FIG. 7 may equally be applied to any images with a known spatial and temporal relationship to said first and second images. Said images with a known relationship to first and second images may comprise data from CT studies and/or Positron Emission Tomography, PET, studies.

Figure 8:
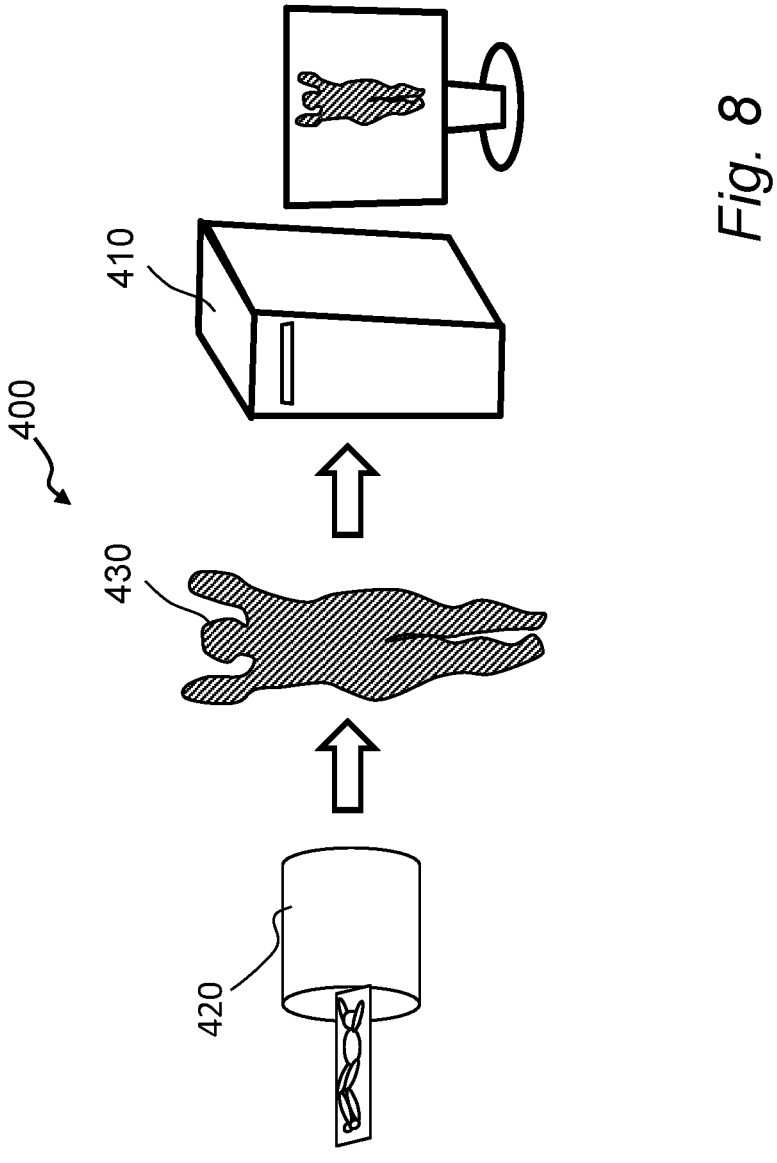
FIG. 8 schematically illustrates acquisition of an image in an x-ray study according to at least one embodiment.

With reference to FIG. 8*a* system 400 for processing image information will be discussed. The system 400 may comprise a processing unit 410, wherein said processing unit 410 is configured to perform the method 100 according to any one of the preceding embodiments.

The system may also comprise an x-ray measuring apparatus, said x-ray measuring apparatus 420 may comprise a CT scanner (computed tomography scanner). Said measuring apparatus 420 may further comprise a PET scanner (Positron emission tomography scanner). The measuring apparatus may be a combined PET-CT scanner. Said system may further be configured to transmit image data 430 from said measuring apparatus 420, to the processing unit 410 wherein said image data 430 may comprise data significant for x-ray attenuation from at least one medical imaging study. Further, the data 430 may comprise data significant for a response from detected radiotracers within the object when said measuring apparatus comprises a PET scanner and/or a combined PET-CT scanner.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A method, implemented in a processing unit, for registering a first image and a second image, wherein said first image comprise data significant for x-ray attenuation from a first medical imaging study and said second image comprise data significant for x-ray attenuation from at least a second medical imaging study, the method comprises obtaining a first tissue class first subimage associated with said first image and comprising information of a first tissue class in said first image, obtaining a first tissue class second subimage associated with said second image and comprising information of said first tissue class in said second image, wherein the first tissue class is bone tissue;

a first registration of said first image to said second image; and a second registration of said first image to said second image, wherein said first registration comprises optimization of a first weighted cost function, said first weighted cost function comprising the sum of a correlation of the first image to the second image with a first weight factor of said first registration; and a correlation of said first tissue class first subimage to said first tissue class second subimage with a second weight factor of said first registration, said first and second weight factors of said first registration are nonzero;

wherein a first set of deformation parameters from said first registration associated with a transformation of said first image to said second image are obtained from said optimization, and wherein said second registration comprises correlation of at least part of said first image to at least part of said second image based on said first set of deformation parameters, wherein a second set of deformation parameters associated with a transformation of said first image to said second image are obtained from said correlation.

2. The method according to claim 1, wherein said first registration provides a first set of constraint parameters defining a set of image voxels in said first image associated with said first tissue class and said second registration takes said first set of constraint parameters into account by said first set of constraint parameters defining a set of voxels in the first image having a predefined limitation of registering when performing said second registration.

3. The method according to claim 1, wherein the method comprises obtaining a second tissue class first subimage associated with said first image and comprising information of a second tissue class in said first image, obtaining a second tissue class second subimage associated with said second image and comprising information of said second tissue class in said second image, wherein the second tissue class is selected from a group comprising lean soft tissue and fat tissue;

wherein the correlation of at least part of said first image to at least part of said second image in said second registration comprises optimization of a second weighted cost function, said second weighted cost function comprising the sum of a correlation of the first image to the second image with a first weight factor of the second registration and a correlation of the second tissue class first subimage to said second tissue class second subimage with a second weight factor of the second registration, said first and second weight factors of the second registration are nonzero, said second registration provides a second set of constraint parameters defining a set of image voxels in said first image associated with said second tissue class, wherein said second set of deformation parameters are obtained from said optimization.

4. The method according to claim 3, wherein the method further comprises obtaining a third tissue class first subimage of said second registration associated with said first image and comprising information of a third tissue class in said first image;

obtaining a third tissue class second subimage of said second registration associated with said first image and comprising information of a third tissue class in said second image, wherein the second tissue class is lean soft tissue and the third tissue class is fat tissue;

wherein the second weighted cost function comprises the sum of a correlation of the first image to the second image with a first weight factor of said second registration a correlation of said second tissue class first subimage to said second tissue class second subimage with a second weight factor of the second registration and a correlation of said third tissue class first subimage to said third tissue class second subimage with a third weight factor of the second registration, said first, second and third weight factors of said second registration are nonzero, said second registration further provides constraint parameters to the second set of constraint parameters defining a set of image voxels in said first image associated with said third tissue class.

5. The method according to claim 1, wherein the method comprises obtaining a fourth tissue class first subimage associated with said first image and comprising information of composed tissues in said first image;

obtaining a fourth tissue second subimage associated with said second image and comprising information of composed tissues in said second image;

wherein said composed tissues are defined as tissues enclosed by subcutaneous fat in said first and second image respectively, obtaining a fifth tissue class first subimage associated with said first image and comprising information of fat tissue in said first image;

obtaining a fifth tissue class second subimage associated with said second image and comprising information of fat tissue in said second image;

an intermediate registration of said first image to said second image based on said first set of deformation parameters, wherein said intermediate registration comprises optimization of a third weighted cost function comprising the sum of a correlation of the first image to the second image with a first weight factor of said intermediate registration, a correlation of the fourth tissue class first subimage to the fourth tissue class second subimage with a second weight factor of said intermediate registration, and a correlation of the fifth tissue class first subimage to the fifth tissue class second subimage with a third weight factor of said intermediate registration, said first, second and third weight factors of the intermediate registration are nonzero, wherein an intermediate set of deformation parameters associated with a transformation of said first image to said second image are obtained from said optimization and said second registration is based on said intermediate set of deformation parameters.

6. The method according to claim 5, wherein said first registration provides a first set of constraint parameters defining a set of image voxels in said first image associated with said first tissue class and said second registration takes said first set of constraint parameters into account by said first set of constraint parameters defining a set of voxels in the first image having a predefined limitation of registering when performing said second registration;

said intermediate registration takes the first set of constraint parameters into account by said first set of constraint parameters defining at least one set of voxels in the first image having a predefined limitation of registering when performing said intermediate registration said intermediate registration provides a third set of constraint parameters defining at least one set of image voxels in said first image associated with said composed tissues and said second registration further takes said third set of constraint parameters into account by said third set of constraint parameters defining at least one set of voxels in the first image having a predefined limitation of registering when performing said second registration.

7. The method according to claim 1, wherein the method further comprises obtaining a sixth tissue class first subimage associated with said first image and comprising information of a sixth tissue class in said first image obtaining a sixth tissue class second subimage associated with said second image and comprising information of said sixth tissue class in said second image, wherein said sixth tissue class is subcutaneous fat;

a third registration of said first image to said second image, wherein said third registration comprises optimization of a fourth weighted cost function of said third registration comprising the sum of a correlation of the first image to the second image with a first weight factor of said third registration; and a correlation of said sixth tissue class first subimage to said sixth tissue class second subimage with a second weight factor of said third registration, said first and second weight factors of said third registration are nonzero;

wherein a third set of deformation parameters associated with a transformation of said first image to said second image are obtained from said optimization.

8. The method according to claim 7, wherein said first registration provides a first set of constraint parameters defining a set of image voxels in said first image associated with said first tissue class and said second registration takes said first set of constraint parameters into account by said first set of constraint parameters defining a set of voxels in the first image having a predefined limitation of registering when performing said second registration;

wherein the method comprises obtaining a second tissue class first subimage associated with said first image and comprising information of a second tissue class in said first image, obtaining a second tissue class second subimage associated with said second image and comprising information of said second tissue class in said second image, wherein the second tissue class is selected from a group comprising lean soft tissue and fat tissue;

wherein the correlation of at least part of said first image to at least part of said second image in said second registration comprises optimization of a second weighted cost function, said second weighted cost function comprising the sum of a correlation of the first image to the second image with a first weight factor of the second registration and a correlation of the second tissue class first subimage to said second tissue class second subimage with a second weight factor of the second registration, said first and second weight factors of the second registration are nonzero, said second registration provides a second set of constraint parameters defining a set of image voxels in said first image associated with said second tissue class, wherein said second set of deformation parameters are obtained from said optimization;

said third registration takes at least said first set of constraint parameters into account, by said first set of constraint parameters defining a set of voxels in the first image having a predefined limitation of registering when performing said third registration, optionally, said third registration takes at least said first and second sets of constraint parameters into account when said first and second sets of constraint parameters are respectively present, by said first and second set of constraint parameters defining a respective set of voxels in the first image having a predefined limitation of registering when performing said third registration, optionally, said third registration takes at least said first, second and third set of constraint parameters into account when said first, second and third sets of constraint parameters are respectively present, by said first, second and third set of constraint parameters defining a respective set of voxels in the first image having a predefined limitation of registering when performing said third registration.

9. The method according to claim 1, wherein each step of obtaining a respective tissue class subimage associated with said first image comprises identifying based on the data in said first image a first set of first image voxels associated with the respective tissue class in said first image and wherein the first set of first image voxels represents the respective tissue class based on the data in said first image, and creating a subimage associated with said first image from said identified first set of first image voxels in said first image, which each step of obtaining a respective tissue class subimage associated with said second image comprises identifying based on the data in said second image a second set of second image voxels associated with the respective tissue class in said second image and the second set of second image voxels represents the respective tissue class based on the data in said second image, and creating a subimage associated with said second image from said identified second set of second image voxels in said second image.

10. The method according to claim 1, wherein each respective correlation of the first image to the second image is selected from a group comprising normalized cross correlation, sum of squared differences and mutual information and wherein each correlation of each first subimage to each respective second subimage is selected from a group comprising normalized cross correlation, sum of squared differences and mutual information.

11. The method according to claim 1, wherein the method comprises:

affine registration of said first tissue class first subimage to said first tissue class second subimage, wherein an initial set of deformation parameters associated with a transformation of said first image to said second image are obtained from said affine registration, wherein said first registration is based on said initial set of deformation parameters and optionally, said method further comprises image cropping of said first tissue class first subimage and said first tissue class second subimage according to a predetermined cropping region.

12. The method according to claim 1, wherein the method comprises initial image adjustment of a first pre-image of said first image and of a second pre-image of said second image, wherein said initial image adjustment outputs said first and second image, respectively, and comprises at least one of intensity scaling comprising linear or non-linear intensity scaling of said first and second pre-image, respectively and image filtering comprising applying at least one of a mean filter, a median filter and a Sobel filter to said first and second pre-image, respectively.

13. The method according to claim 1, comprising deforming said first image based on any of said sets of deformation parameters.

14. The method according to claim 1, the method comprising obtaining a third image captured in a Positron Emission Tomography, PET, study, wherein said third image has a known spatial and temporal relationship to said first image;

deforming said third image based on any of said sets of deformation parameters.

15. A system for processing image information comprising a processing unit, wherein said processing unit is configured to perform the method according to claim 1.

* * * * *